United States Patent
Farnham

(10) Patent No.: US 9,680,580 B2
(45) Date of Patent: Jun. 13, 2017

(54) WIRELESS COMMUNICATION METHODS AND APPARATUS

(71) Applicant: Kabushiki Kaisha Toshiba, Minato-ku (JP)

(72) Inventor: Timothy David Farnham, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 340 days.

(21) Appl. No.: 14/052,846

(22) Filed: Oct. 14, 2013

(65) Prior Publication Data

US 2014/0119217 A1    May 1, 2014

(30) Foreign Application Priority Data

Oct. 30, 2012  (GB) .................................. 1219498.1

(51) Int. Cl.
*H04W 16/14*    (2009.01)
*H04B 17/00*    (2015.01)
(Continued)

(52) U.S. Cl.
CPC ..... *H04B 17/0092* (2013.01); *H04B 17/3911* (2015.01); *H04B 17/318* (2015.01); *H04W 16/14* (2013.01); *H04W 52/325* (2013.01)

(58) Field of Classification Search
None
See application file for complete search history.

(56) References Cited

U.S. PATENT DOCUMENTS

| 7,079,809 B1* | 7/2006 | Scherzer | H01Q 3/24 455/101 |
| 2003/0053413 A1* | 3/2003 | Sawahashi | H04B 1/692 370/208 |

(Continued)

FOREIGN PATENT DOCUMENTS

| JP | 2007-088569 A | 4/2007 |
| JP | 2007-538265 A | 12/2007 |

(Continued)

OTHER PUBLICATIONS

Office Action issued Nov. 4, 2014 in Japanese Patent Application No. 2013-226057 (with English translation).

(Continued)

*Primary Examiner* — Hassan Phillips
*Assistant Examiner* — Ayanah George
(74) *Attorney, Agent, or Firm* — Oblon, McClelland, Maier & Neustadt, L.L.P.

(57) ABSTRACT

A method in a wireless system, including: receiving, at a wireless device, over first and second networks, from each of plural radios of the first and second networks, respective first and second sets of reference signals received from first radios of the first and second networks, and plural further reference signals received from remaining radios of plural radios of the first and second networks, the first radios of the first and second networks located at a common location; calculating first and second sets of normalized reference signals from ratios for each further reference signal of the first and second sets of reference signals with the first and second reference signals of the first and second sets of reference signals; comparing predictions of signal loss based on the first and second sets of normalized reference signals; and determining an estimate of shadow fading or signal reflectors using the comparison result.

17 Claims, 8 Drawing Sheets

(51) Int. Cl.
*H04B 17/391* (2015.01)
*H04W 52/32* (2009.01)
*H04B 17/318* (2015.01)

(56) References Cited

U.S. PATENT DOCUMENTS

| | | | |
|---|---|---|---|
| 2007/0127559 A1* | 6/2007 | Chang | ................ H04B 17/0087 |
| | | | 375/213 |
| 2008/0233955 A1* | 9/2008 | Narang | ................ H04W 48/16 |
| | | | 455/434 |
| 2008/0261622 A1 | 10/2008 | Lee et al. | |

FOREIGN PATENT DOCUMENTS

| | | | |
|---|---|---|---|
| JP | 2008-042922 A | 2/2008 | |
| JP | 2010-045493 A | 2/2010 | |
| KR | WO 2007021071 A1 * | 2/2007 | ........... G01S 5/0205 |
| WO | WO 2007/021071 A1 | 2/2007 | |
| WO | WO 2010/015286 A1 | 2/2010 | |
| WO | WO 2010/116688 A1 | 10/2010 | |

OTHER PUBLICATIONS

United Kingdom Search Report issued Mar. 6, 2013 in GB 1219498. 1, filed on Oct. 30, 2012 ( with written opinion).

* cited by examiner

WIRELESS COMMUNICATION METHODS AND APPARATUS

CROSS REFERENCE TO RELATED APPLICATION

This application is based upon and claims the benefit of priority from United Kingdom patent application number 1219498.1 filed 30 Oct. 2012, the entire contents of which are incorporated herein by reference.

FIELD

Embodiments described herein relate generally wireless communications and the calculation and use of a normalised path loss model in wireless network systems which incorporate more than one radio access technology.

BACKGROUND

Radio access networks utilise measurements of the radio environment in order to perform resource management tasks such as access selection, handover and channel assignments. There is a growing trend towards exploiting different radio access technologies (RATs) and radio bands to improve efficiency of spectrum utilisation. This brings with it the potential for multiple technologies to co-exist in the same environment using the same or different bands.

BRIEF DESCRIPTION OF THE DRAWINGS

In the following, embodiments are described, by way of example only, with reference to the accompanying drawings in which.

DETAILED DESCRIPTION

Figure 1:
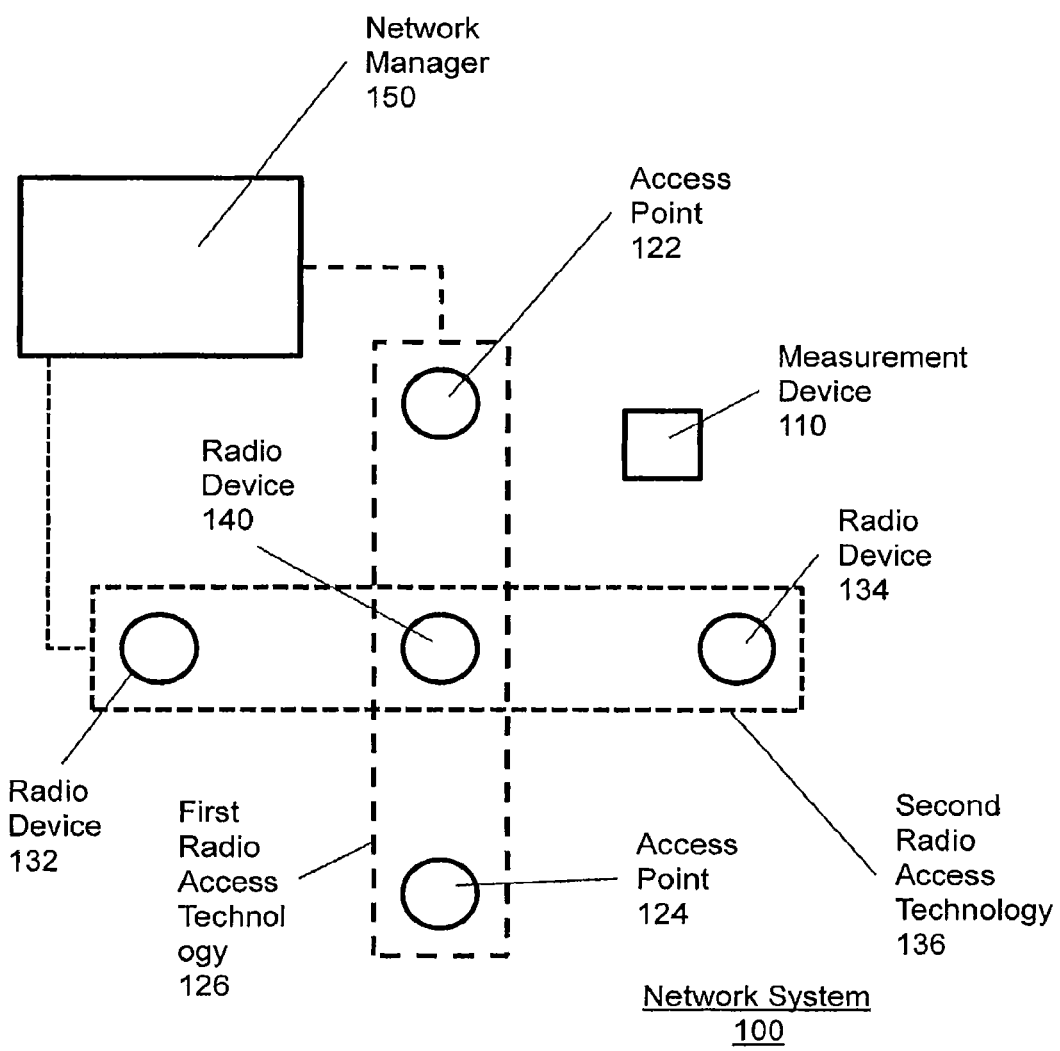
FIG. 1 shows a wireless network system of an embodiment.

In one embodiment, a method in a wireless system, the method comprises receiving, at a wireless device of the wireless system, over a first network, from each of a plurality of radios of the first network, a respective reference signal, the respective reference signals forming a first set of reference signals comprising a first reference signal received from a first radio of the first network, and a plurality of further reference signals received from the remaining radios of the plurality of radios of the first network; receiving, at the wireless device, over a second network, from each of a plurality of radios of the second network, a respective reference signal, the respective reference signals forming a second set of reference signals comprising a first reference signal received from a first radio of the second network, and a plurality of further reference signals received from the remaining radios of the plurality of radios of the second network, wherein the first radio of the first network and the first radio of the second network are located at a common location; calculating a first set of normalised reference signals from the ratio for each further reference signal of the first set of reference signals with the first reference signal of the first set of reference signals; calculating a second set of normalised reference signals from the ratio for each further reference signal of the second set of reference signals with the first reference signal of the second set of reference signals; comparing predictions of signal loss based on first set of normalised reference signals and the second set of normalised reference signals; and determining an estimate of shadow fading or signal reflectors using the result of the comparison.

In one embodiment, the first network has a first communication protocol over a first frequency band and the second network has a second communications protocol over a second frequency band.

In one embodiment, comparing predictions of signal loss based on first set of normalised reference signals and the second set of normalised reference signals comprises normalising the predictions of path loss to a reference frequency.

In one embodiment, the method further comprises determining from each respective reference signal a transmitted power level for the reference signal and wherein calculating the first and second set of normalised reference signals comprises adjusting the ratio to account for the transmitted power level.

In one embodiment, a method in a wireless system, the wireless system comprising a first wireless network and a second wireless network, comprises receiving an indication of signal strengths of a first set of reference signals, the first set of reference signals comprising a first reference signal received by a wireless device from a first node of the first network, and a plurality of further reference signals received by the wireless device from the further nodes of the first network; receiving an indication of signal strengths of a second set of reference signals, the second set of reference signals comprising a first reference signal received by the wireless device from a first node of the second network, and a plurality of further reference signals received by the wireless device from the further nodes of the second network, wherein the first node of the first network and the first node of the second network are located at a common location; calculating a first set of normalised reference signals as the ratio for each further reference signal of the first set of reference signals with the first reference signal of the first set of reference signals; calculating a second set of normalised reference signals as the ratio for each further reference signal of the second set of reference signals with the first reference signal of the second set of reference signals; comparing predictions of signal loss based on first set of normalised reference signals and the second set of normalised reference signals; and determining an estimate of shadow fading or signal reflectors using the result of the comparison.

In one embodiment, the first network has a first communication protocol over a first frequency band and the second network has a second communications protocol over a second frequency band.

In one embodiment, comparing predictions of signal loss based on first set of normalised reference signals and the second set of normalised reference signals comprises normalising the predictions of path loss to a reference frequency.

In one embodiment, the method further comprises determining from each respective reference signal a transmitted power level for the reference signal and wherein calculating the first and second set of normalised reference signals comprises adjusting the ratio to account for the transmitted power level.

In one embodiment, each of the reference signals is transmitted at the same power level.

In one embodiment, the method further comprises determining whether a node in the network is a hidden node using the estimate of shadow fading or signal reflectors.

In one embodiment, a network management module for a wireless network system comprises an interface operable to receive an indication of signal strengths of a first set of reference signals, the first set of reference signals comprising a first reference signal received by a wireless device from a first node of a first network, and a plurality of further reference signals received by the wireless device from the further nodes of the first network; and receive an indication of signal strengths of a second set of reference signals, the second set of reference signals comprising a first reference signal received by the wireless device from a first node of a second network, and a plurality of further reference signals received by the wireless device from the further nodes of the second network, wherein the first node of the first network and the first node of the second network are located at a common location; and a processor operable to calculate a first set of normalised reference signals as the ratio for each further reference signal of the first set of reference signals with the first reference signal of the first set of reference signals; calculate a second set of normalised reference signals as the ratio for each further reference signal of the second set of reference signals with the first reference signal of the second set of reference signals; compare predictions of signal loss based on first set of normalised reference signals and the second set of normalised reference signals; and determine an estimate of shadow fading or signal reflectors using the result of the comparison.

In one embodiment, the first network has a first communication protocol over a first frequency band and the second network has a second communications protocol over a second frequency band.

In one embodiment, the processor is operable to compare predictions of signal loss based on first set of normalised reference signals and the second set of normalised reference signals by normalising the predictions of path loss to a reference frequency.

In one embodiment, a measurement device for a wireless network comprises a first communications module operable to receive, over a first network, from each of a plurality of radios of the first network, a respective reference signal, the respective reference signals forming a first set of reference signals comprising a first reference signal received from a first radio of the first network, and a plurality of further reference signals received from the remaining radios of the plurality of radios of the first network; a second communications module operable to receive, over a second network, from each of a plurality of radios of the second network, a respective reference signal, the respective reference signals forming a second set of reference signals comprising a first reference signal received from a first radio of the second network, and a plurality of further reference signals received from the remaining radios of the plurality of radios of the second network, wherein the first radio of the first network and the first radio of the second network are located at a common location; and a processor operable to calculate a first set of normalised reference signals from the ratio for each further reference signal of the first set of reference signals with the first reference signal of the first set of reference signals; calculate a second set of normalised reference signals from the ratio for each further reference signal of the second set of reference signals with the first reference signal of the second set of reference signals; compare predictions of signal loss based on first set of normalised reference signals and the second set of normalised reference signals; and determine an estimate of shadow fading or signal reflectors using the result of the comparison.

In one embodiment, the first network has a first communication protocol over a first frequency band and the second network has a second communications protocol over a second frequency band.

In one embodiment, the processor is operable to compare predictions of signal loss based on first set of normalised reference signals and the second set of normalised reference signals by normalising the predictions of path loss to a reference frequency.

One embodiment provides a computer program product comprising computer executable instructions which, when executed by a processor, cause the processor to perform a method as set out above. The computer program product may be embodied in a carrier medium, which may be a storage medium or a signal medium. A storage medium may include optical storage means, or magnetic storage means, or electronic storage means.

The described embodiments can be incorporated into a specific hardware device, a general purpose device configured by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

FIG. 1 shows a wireless network system according to an embodiment. The wireless network system 100 comprises a plurality of radio devices. A measurement device 110 is configured to receive reference signals from radio devices of the wireless system 100. The wireless network system 100 is a multi-technology or multi-band deployment, for example in an indoor environment. Two radio devices or access points (APs) 122 124 of the wireless system 100 are configured to use a first radio access technology 126. Two radio devices 132 134 of the wireless system 100 are configured to use a second radio access technology 136. One radio device 140 is configured to use both the first radio access technology 126 and the second radio access technology 136. The wireless network system 100 is managed by a network manager 150. The network manager 150 uses a normalised path loss model to manage the network system 100. The calculation of the normalised path loss model is described in more detail below.

Figure 2:
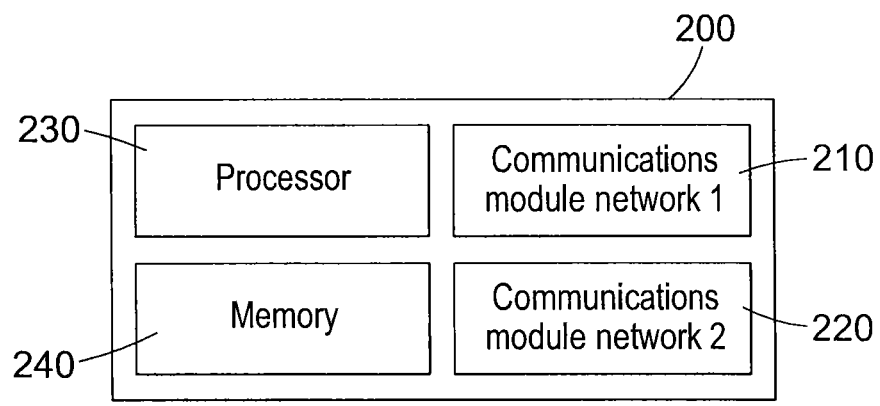
FIG. 2 shows a measurement device of an embodiment.

FIG. 2 shows a measurement device 200 according to an embodiment. The measurement device 110 shown in FIG. 1 may be implemented as the measurement device 200 shown in FIG. 2. The measurement device 200 has a first communications module 210 configured to receive signals over a first network access technology and a second communications module 220 configured to receive signals over a second network access technology. The measurement device 200 has a processor 230 and a memory 240.

Figure 3:
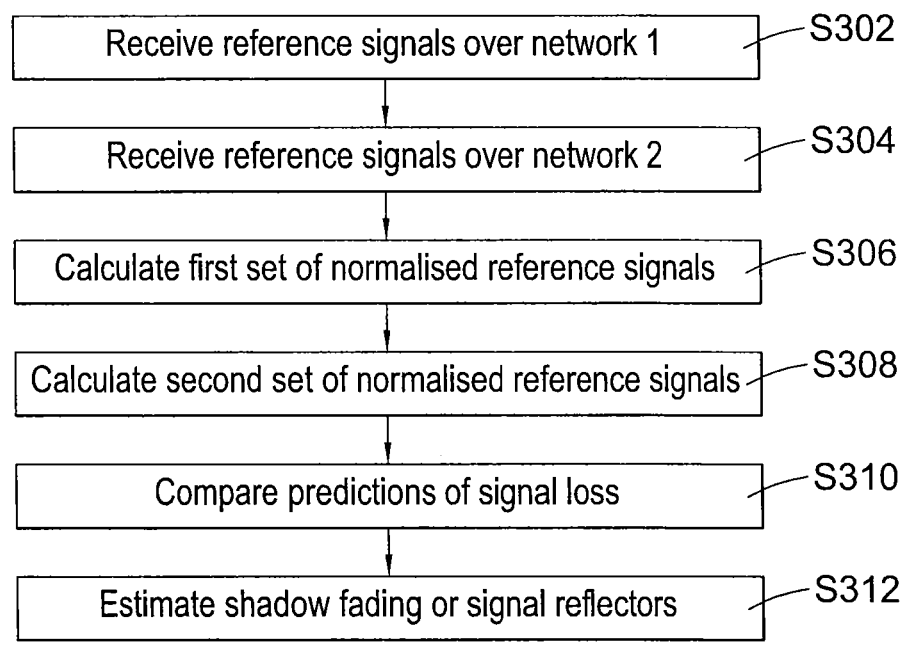
FIG. 3 shows a method of estimating shadow fading or signal reflectors of an embodiment.

FIG. 3 is a flowchart illustrating a method of calculating a normalised path loss model which may be implemented by the measurement device shown in FIG. 2. The process to obtain the path loss predictions is based on multiple sets of three or more reference signal measurements from one technology/band arranged in an orthogonal manner. For instance, three measurements from 802.11 2.4 GHz (WiFi) signals on one axis and three measurements from 802.11 5 GHz signals on a perpendicular axis. One reference signal from each set is from the same device/location.

In step S302 the measurement device receives reference signals over the first network. In step S304 the measurement device receives reference signals over the second network.

In step S306 a first set of normalised reference signals are calculated. The reason for arranging sets of three measurements is so that each prediction is compensated for receiver measurement inaccuracies. In consumer radio devices, the accuracy of individual measurements is poor. This is due to lack of calibration combined with temperature, frequency and bandwidth dependent variations and the fading inherent in radio propagation. Therefore, rather than taking single individual values, the proposed approach combines different sets of measurements taken within a certain time period (epoch or snapshot) in a relative manner only using the ratio of one reference measurement to another rather than absolute values. It is also further assumed that reference signals can be of different technologies and hence the correlation between these disparate measurements is achieved by the technology specific layer 2 addresses and the existence of collocated or multi-technology capable radios in the environment.

The reference signals may be transmitted at the same signal level. Alternatively, the measuring device may receive an indication of the transmission power level of the reference signals.

In step S308 a second set of normalised reference signals is calculated.

In this manner the path-loss is determined without the problem of considering receiver accuracy. As both sets of measurements can now resolve the signal path-losses relative to a known common denominator they can then be combined to form two predictions regarding the relative path-loss signal space. The predictions of path loss are compared in step S310.

In step S312 shadow fading caused by obstructions in one or more of the measurements which contributes to the mismatch between predictions is estimated by applying a compensation to the path-loss predictions that takes account of frequency (or bandwidth/RAT) dependent variation.

In an embodiment, the measuring devices of the wireless network system 100 shown in FIG. 1 measure the reference signal strengths and the calculation of the normalised path loss model takes place in the network manager 150. The network manager 150 may be implemented as a network reconfiguration manager (NRM) as defined within the IEEE 1900.4 standard. Alternatively, the network manager may be implemented as a proprietary central resource management (CRM) server.

Figure 4:
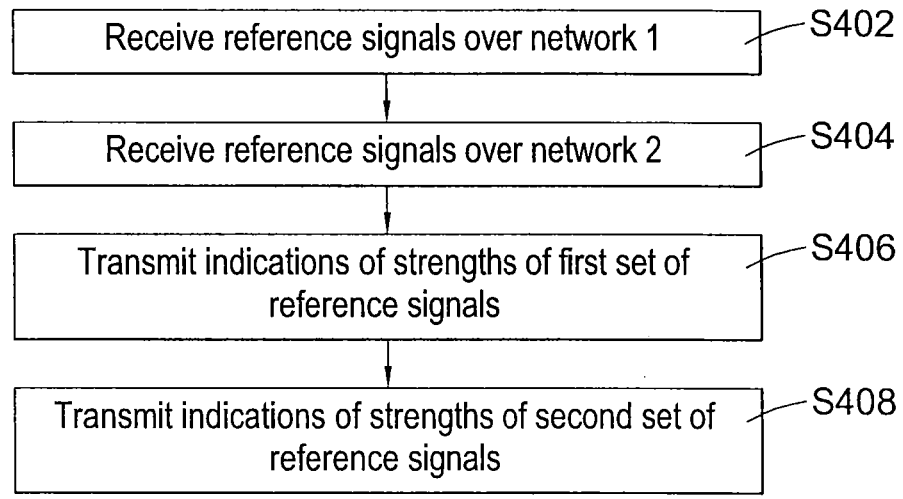
FIG. 4 shows a method carried out on a measuring device according to an embodiment.

FIG. 4 shows the method steps carried out by a measuring device in a system in which the normalised path loss model is calculated by the network manager. In step S402, the measuring device receives reference signals over the first network. As in the method shown in FIG. 3, the measuring device receives reference signals from at least three radios such as wireless access point. The measuring device measures the strength of the reference signals. In step S404, the measuring device receives reference signals from at least three radios over the second network. As described above, the measuring device receives reference signals over both the first network and the second network from one of the radio transmitters. In step S406, the measuring device transmits indications of a first set of measured signal strengths of reference signals. In step S408, the measuring device transmits indications of a second set of measured strengths of reference signals.

Figure 5:
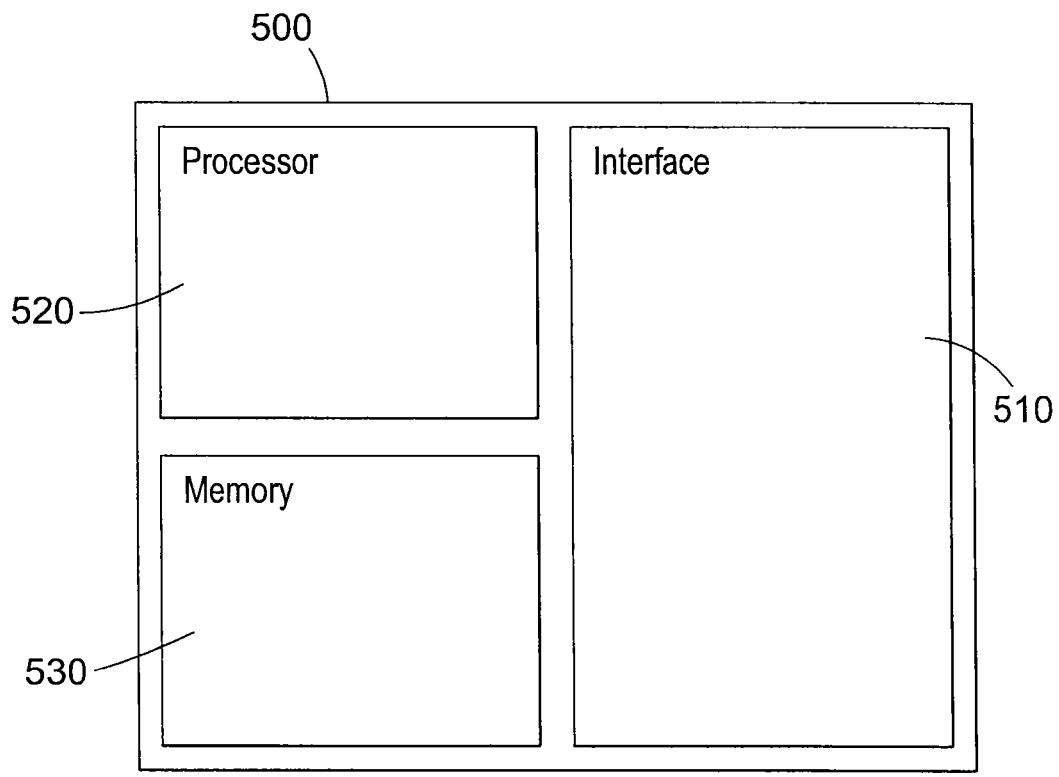
FIG. 5 shows a network manager of an embodiment.

FIG. 5 shows a network manager 500 according to an embodiment. The network manager 500 may be located on one of the radios of the wireless system or alternatively may be separately located as shown in FIG. 1. The network manager 500 has an interface 510 through which it communicates with other components of the network. The network manager 500 has a processor 520 and a memory 530.

Figure 6:
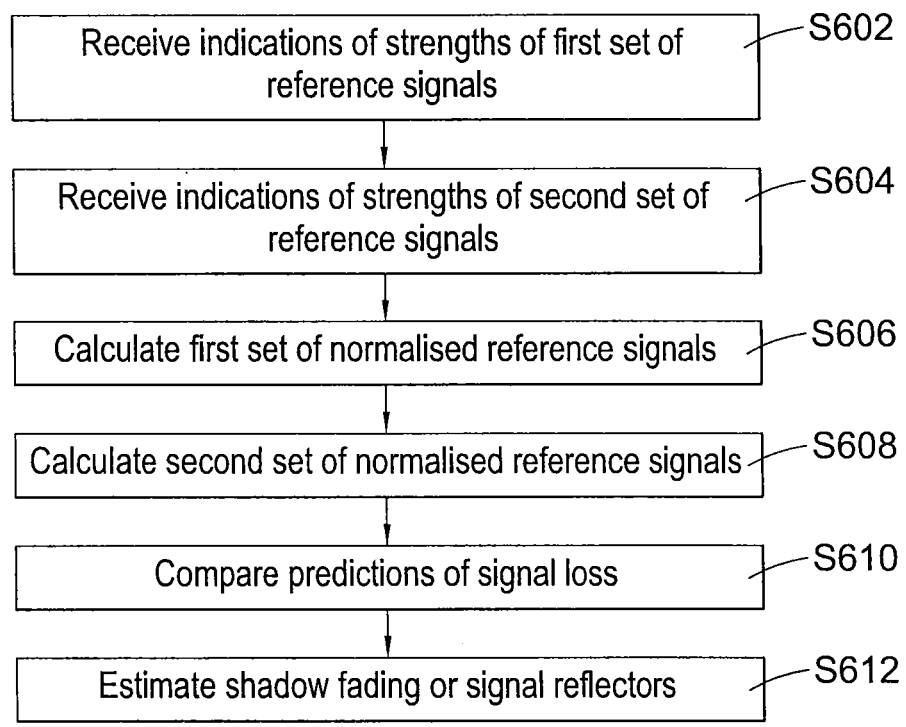
FIG. 6 shows a method of estimating shadow fading or signal reflectors according to an embodiment.

FIG. 6 shows a flowchart illustrating a method of calculating a normalised path loss model according to an embodiment. The method of FIG. 6 may be implemented on the network manager 500 shown in FIG. 5. In steps S602 and S604, a first and second set of indications of signal strengths are received. The first and second sets of reference signal strengths are measured by a measurement device as described in relation to FIG. 4.

In step S606, a first set of normalised reference signals are calculated. The first set of normalised reference signals is calculated as the ratio of the reference signal strength received from the radio devices of the first network with the reference signal strength received from the radio device which transmits over both the first network and the second network.

In step S608, a second set of normalised reference signals is calculated. The second set of normalised reference signals is calculated as the ratio of the reference signal strength received from the radio devices of the second network with the reference signal strength received from the radio device which transmits over both the first network and the second network.

In step S610, predictions of signal loss from the first set of normalised reference signals and the second set of normalised reference signals are compared.

In step S612, shadow fading or signal reflectors are estimated from the difference between the predictions of signal loss.

The normalisation to a certain frequency reference can be performed by using the general distance/path loss equation below:

$$L = 20 \text{Log}\left(\frac{4\pi d}{\lambda}\right)$$

-continued
$$L = 20\text{Log}(4\pi d) - 20\text{Log}(\lambda)$$

where d is distance and λ the wavelength and L is represented in decibels (dB).

From the above expression it is possible to see a distance dependent component and a frequency dependent component. Therefore, the frequency dependent component can be used to normalise measurements to a reference frequency. For instance to normalise a 5 GHz measurement to 2.4 GHz would require the subtraction of around 6.4 dB.

It is well known that the accuracy of radio signal level measurements is generally poor, and has limited dynamic range, in commercial radio devices. For example IEEE 802.11k specifies a receive power indicator accuracy of +/−5 dB with 95% confidence. However, the precision is often much better. The accuracy offsets are largely due to the lack of formal calibration within the manufacturing process and also temperature, bandwidth and frequency dependent device level variations. The use of normalised path loss models can compensate for these inaccuracies by permitting the exploitation of multiple measurements across different physical transmitter references and frequencies. For instance, relative signal measurements made with the same measurement device will compensate the calibration offsets and may also enable compensation for other factors such as temperature, bandwidth and frequency dependent variations.

Another factor affecting the measurements is that the specification of other RAT for example a primary user or alternative secondary user RAT may not be known at design or deployment time and hence may have unknown characteristics. For instance, a new type of RAT mode may be developed after a solution for hidden node prediction and detection has been deployed and hence must still work with the new RAT. Therefore, an ideal hidden node prediction/detection solution should not rely on RAT specific features to be able to provide the required reliability.

The normalised path loss model approach described here exploits RAT specific measurements in order to obtain unique radio RAT specific transmitter identification. If no RAT specific information were used it would not be able to resolve radio devices by unique identifiers, which must then be obtained by other means. For example by measurement correlation with absolute geographic location and with direction of arrival measurements. In the normalised path loss model approach the RAT specific measurements are reported by the measurement devices in the same manner as other existing standards (such as IEEE 802.11k, IEEE 1900.4, IEEE 802.21). This means that no new standard is required for the abstraction of the generic radio context information data model. However, the processing is performed in a manner that combines these measurements which is described below.

The individual measurements taken by the measurement devices can be combined to make predictions about the likely interference. The first step is to utilise relative signal references to eliminate inaccuracies in measurements. The next step is to generate the normalised path loss model to estimate inter-device radio interference levels for which no measurements are available. This may occur, for example, due to RATs not being currently active or the measurement device not being configured for that RAT or not sensitive enough. Then the normalised path loss model results can be used within resource management processes such as configuration optimisation, handover triggering or channel assignment.

If necessary, the measurement accuracy can also be obtained by the process, along with the actual measurements, using existing standards (such as IEEE 1900.4) within the measurement meta-data value characteristic. Then relative values applied when the measurement device accuracy is poor to compensate for this error. The relative values are based on the relative ratio of signal strength received from two reference signals rather than their absolute numeric values. For instance, the ratio of a RAT signal received from one radio device to another received from a different radio device using the same measurement device. The normalised path loss model processing that is required to determine the relative path-loss of the measurement device with respect to the central transmitter (or vice versa) is then given by the geometric calculation described below.

Figure 7:
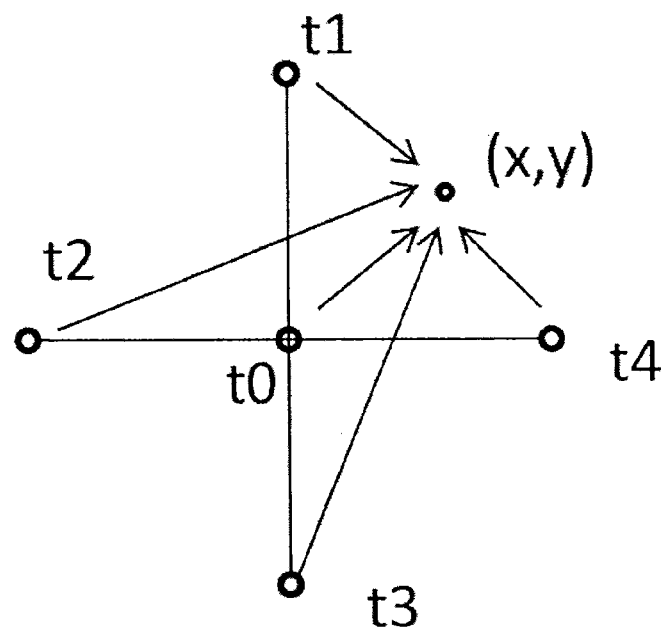
FIG. 7 shows an arrangement of radio transmitters and a measuring device in signal space in an embodiment.

FIG. 7 shows an arrangement of radio transmitters and a measuring device. In FIG. 7, the central device t0 transmits signals over both technologies. Two devices t1 and t3 transmit reference signals using a first radio access technology and two devices t2 and t4 transmit reference signals using a second radio access technology. The reference signal sets in this example are (t0,t1,t3) and (t0,t2,t4). Therefore, both contain reference t0 although in the first set the t0 reference could be within the 2.4 GHz 802.11 band and the second set could be using the 5 GHz 802.11 band. It is not expected that the two predictions match. In fact it is the difference between the two predictions that is useful to consider.

Figure 8:
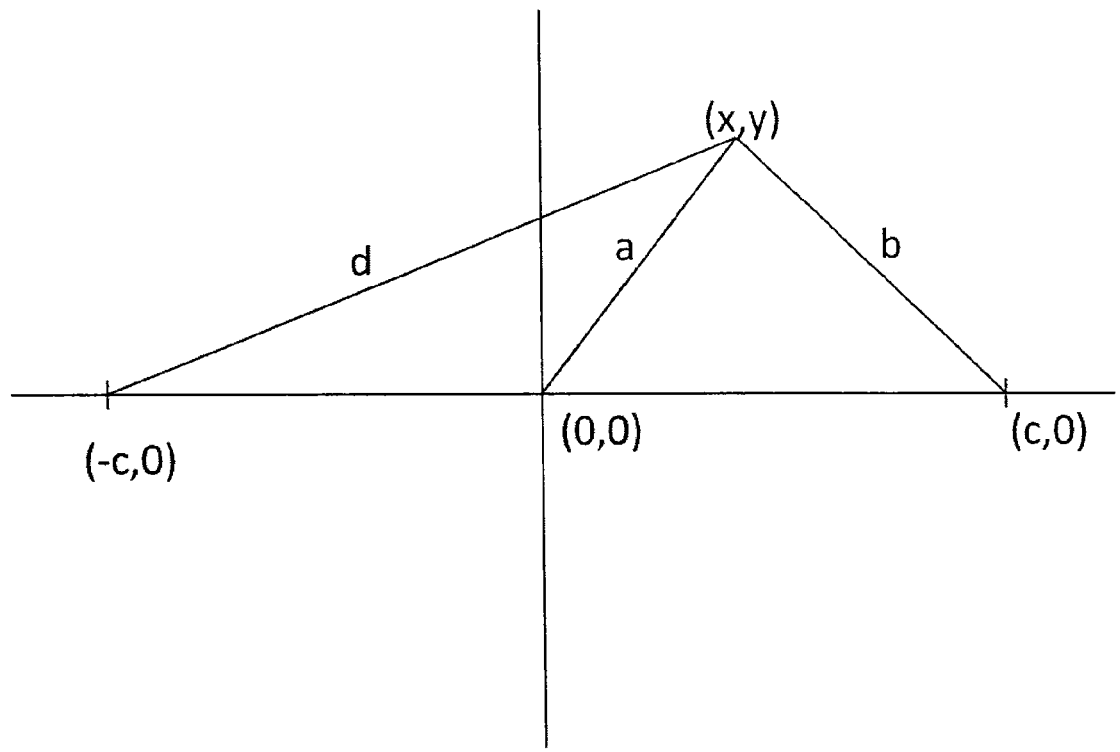
FIG. 8 illustrates the calculation of the predicted location in the relative path loss space of a measurement device in an embodiment.

FIG. 8 illustrates the calculation of the predicted location in the relative path loss space of the measurement device.

If a corresponds to path-loss between receiver at (x,y) and transmitter t0 and b is the path-loss between (x,y) and t1,2, where t corresponds to the transmitted reference signal received at point (x,y) for the transmission from transmitter t, then a and b may be written as follows:

$$a = \sqrt{x^2 + y^2}$$

$$b = \sqrt{y^2 + (c-x)^2}$$

where c is the separation of the transmitters.

If the ratio r is defined as follows:

$$b = a \cdot r$$

then the equations for a and b written above may be combined to give:

$$r^2 = \frac{y^2 + (c-x)^2}{y^2 + x^2}$$

$$r^2(y^2 + x^2) = y^2 + c^2 - 2cx + x^2$$

which gives y as follows:

$$y \pm \sqrt{\frac{c^2 - 2cx}{r^2 - 1} - x^2}$$

If s is defined as s=a/d, where d is the path-loss between (x,y) and t3,4 and y is calculated in terms of d, the following is obtained:

$$\frac{c^2 + 2cx}{s^2 - 1} = \frac{c^2 - 2cx}{r^2 - 1}$$

$$\left(\frac{r^2-1}{s^2-1}\right)(c^2+2cx) = c^2 - 2cx$$

$$2x\left(\left(\frac{r^2-1}{s^2-1}\right)+1\right) = c\left(1-\left(\frac{r^2-1}{s^2-1}\right)\right)$$

$$x = \frac{c(s^2-r^2)}{2(r^2+s^2-2)}$$

The impact of frequency on path-loss is known and so a normalisation to a suitable reference is possible (i.e. such as 2.4 GHz in this case). The frequency dependent component of path-loss for normal operating frequencies can be approximately given (in dB) by:

20 Log(λ)

Then the remaining difference between the two predictions is now likely to be caused by fading/scattering. Hence the dynamic shadowing phenomena can be taken into account in the model without needing to know the exact physical deployment layout and geographic locations.

Figure 9:
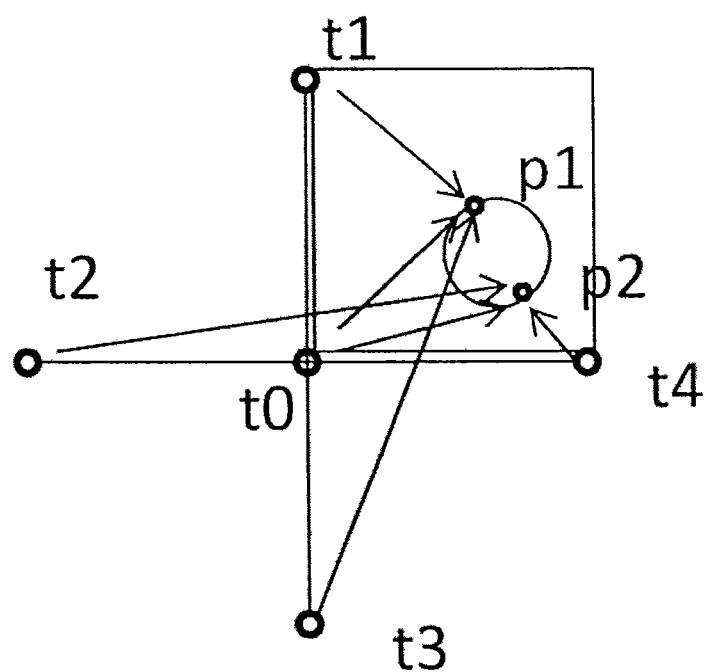
FIG. 9 shows different measurement predictions the location of a measurement device using different measurement sets in an embodiment.

FIG. 9 shows the different measurement predictions of (x,y) using different measurement sets. The different measurement predictions are labelled (prediction) p1, p2, . . . and provide an indication of the magnitude of the shadow fading. The shadow fading may be taken as, for instance, the mean or largest distance between predictions (p1 . . . pn). Therefore, there is a region of uncertainty in the actual true path-loss vector of the receiver device, which is within the circle centred on the mid-way or average point between p1 and p2. The region of uncertainty may be more precisely determined with more measurement combining.

For most purposes there is a trade-off between the amount of measurements combined or the measurement overhead and the confidence in defining the uncertainty region. Taking the largest error out of the set of all the measurements combined results in a high confidence.

This is sufficient for some scenarios such as handover triggering for hidden node avoidance, as described below. A more complex—probabilistic clustering—approach can provide an estimate of this certainty.

The above analysis shows that the exact signal related coordinate (in two dimensions) relative to a transmitter can be computed from relative signal strengths (i.e. no measurement accuracy assumption required) received from three equal power (and bandwidth) transmitters arranged in a linear manner with equal separation (c). The ambiguity in the y dimension can be resolved by a single extra orthogonal measurement. For non-linear arrangement (i.e. not grid aligned) the computation becomes harder but is still possible, by rotation of the axes. Also, a generalisation to a three dimensional mapping can occur with at least one (and ideally two) additional orthogonal measurement points. Applying the same equation as above (with additional $z^2$ term) resolves the one dimensional coordinate (i.e. x position) and providing the receiving antenna has consistent gain versus the angle/elevation of arrival, the orthogonal measurements will enable resolution of y and z coordinates.

The relative signal coordinates can be used to estimate path loss and hence performance or interference levels regardless of RAT, frequency band or bandwidth (or other inaccuracies) as they have been normalised using the relative signal (path loss). For instance, a second set of three measurements (from a second measurement device) can be used to determine a second coordinate, which can now be directly compared with the first coordinate to estimate a signal path loss and hence interference levels (given criteria such as transmit power and receiver performance) between the two. This can then be used within channel assignments, handover optimisation or hidden node detection and avoidance.

Figure 10:
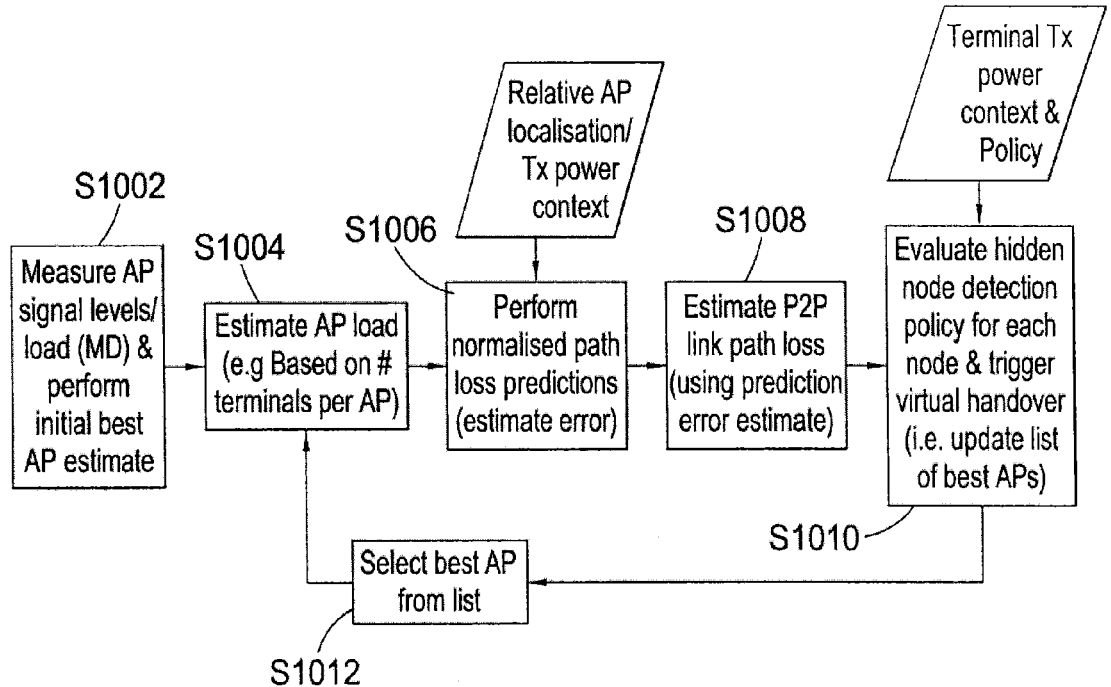
FIG. 10 shows a method of avoiding hidden nodes in a wireless system of an embodiment.

FIG. 10 shows a method of avoiding hidden nodes which uses the normalised path loss model described above. The method uses the normalised path loss model to predict hidden nodes and performs an access point (AP) selection to avoid hidden nodes while performing load balancing.

In step S1002 the measuring devices measure the signal levels of neighbouring access points and perform an initial hypothetical AP selection based on this. In step S1004 the load on the APs is estimated using the number of terminals assigned to each AP in terms of a combination of signal level and load.

In step S1006, the one of the methods described above is used to estimate the error in the localisation prediction. This gives for example the amount of shadowing. If the error is above a threshold (E) a static shadowing is assumed, otherwise a prediction is made based on maximum observed prediction difference.

In step S1008 the point to point path loss is estimated using the estimated shadow fading.

In step S1010 hidden nodes are determined in the network using context information regarding the transmit power and predicted path losses.

A hidden node policy rule is then evaluated against the terminals with their corresponding hypothetically selected APs. On detection of a hidden node the relevant "virtual hand over" (VHO) is initiated to the next best AP in their list and the whole process repeated. In this manner the number of hidden nodes is reduced until none exist or the maximum number of iterations is reached.

Figure 11:
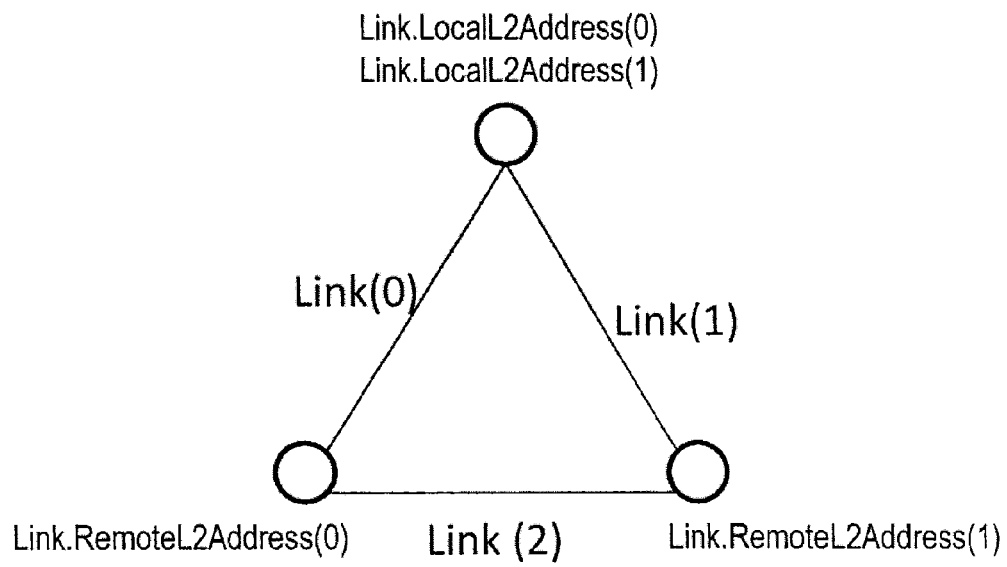
FIG. 11 illustrates a hidden node policy of an embodiment.

The hidden node policy is described in detail in relation to FIG. 11. The first step is to define the meaning of a hidden node in terms of a constraint policy. For example, a condition/logical/action (similar to event, condition, action policy) set specification definition of a hidden node may be used.

```
IF   {channel(0) = channel(1)} AND
     {link.rxsignallessmargin(0) < rxsignalstrength(1)} AND
     {link.locall2address(0) = locall2address(1)} AND
     {link.remotel2address(1) != remotel2address(0)} AND
     {link.remotel2address(2) = remotel2address(0)} AND
     {link.locall2address(2) = remotel2address(1)} AND
     {link.rxsignalstrength(2) < THRESHOLD} THEN EXCLUDE
```

The above policy indicates the necessary constraints in order to avoid hidden nodes. There are seven conditions that first specify whether the link objects under comparison are on the same channel, then whether the signal strength of one link is less than within a certain margin of the second. Next the addresses are compared to determine that the links are distinct and have a common local node that can hear both the wanted node and the hidden node. Finally the link between the wanted and hidden node must have signal strength less than the detection threshold. The detection threshold may be selected as THRESHOLD=−95 dBm.

The hidden node in this derivation assumes that the minimum reliable signal strength sensing level for the RAT is given by THRESHOLD. When signals are below this level it is assumed that it is not possible for the wanted node with address link.remotel2address(0) to detect the transmissions of the hidden node at address link.remotel2address(1).

Figure 12:
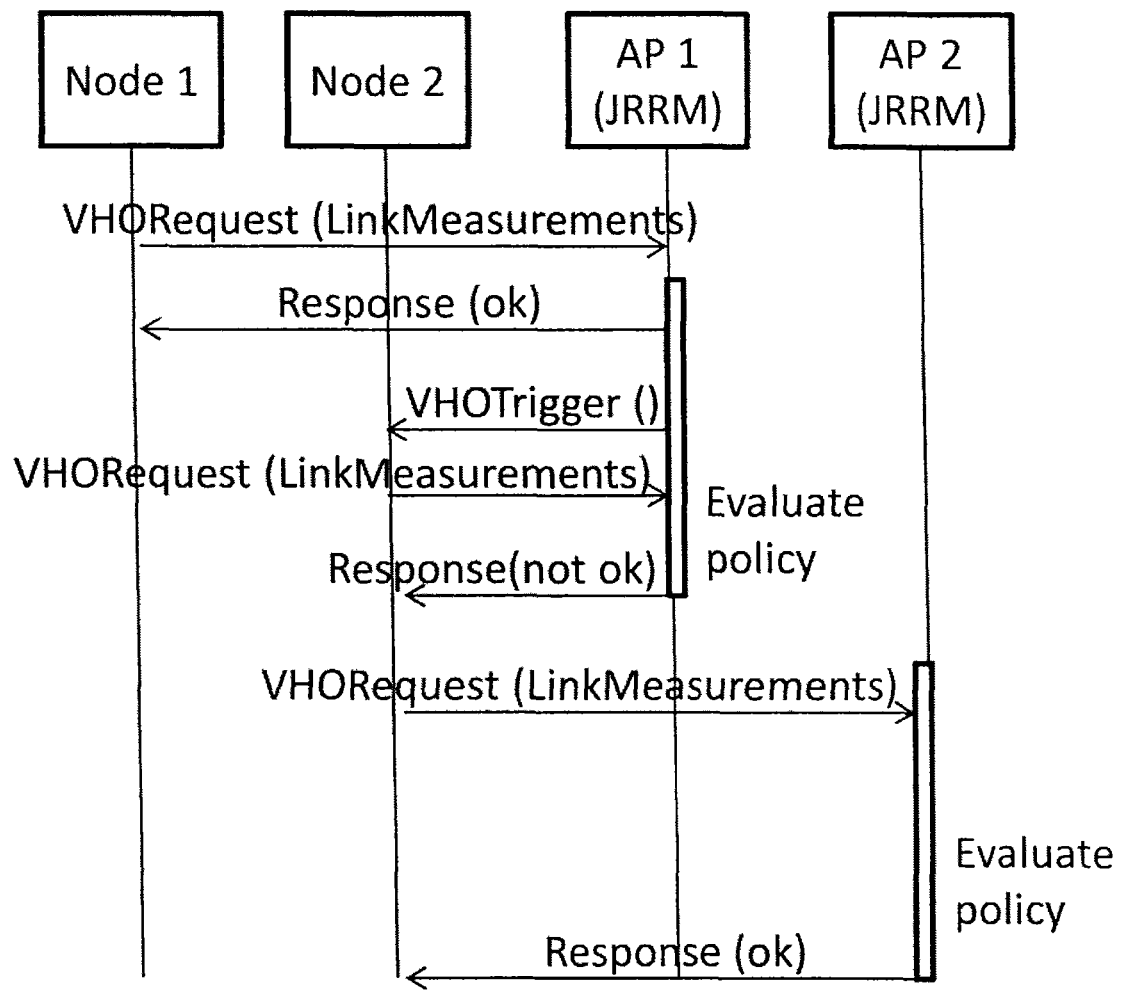
FIG. 12 shows messages transmitted in a method of avoiding hidden nodes of an embodiment.

The virtual handover (VHO) approach is shown in FIG. 12. A trigger is sent to a node that has been detected as matching the hidden node policy. On receiving this trigger, the node then looks at the next best AP and submits its measurements to see if this AP hidden node policy matches or not. In this manner several APs can be tested before actually performing a real handover. The real handover comes at the point at which an AP accepts the node (i.e. no policy match) and hence all nodes are acceptable to the Joint Radio Resource Management (JRRM) policy at each AP. However, as the aim is to also balance the load across APs as much as possible the suitability is weighted with the load and hence although load does not trigger the VHO it is used to estimate the best alternative APs (i.e. the list of best APs for each node). Therefore, the response message can contain the list of best alternative AP (i.e. based on proximity and most recent estimate of loading) or just the next best AP.

The message format for the measurements and VHO trigger are shown below.

| 1) VHO Request |
| --- |
| LinkMeasurements ::= SEQUENCE OF SEQUENCE { <br>     LinkMeasurementName LinkMeasurementId <br>     LinkMeasurementValue ANY <br> } |

TABLE 1

LinkMeasurement data model

| LinkMeasurementName | Description | Meta data |
| --- | --- | --- |
| rxSignalStrength | Received signal level indicator (in dBm) for the link | The period (window) over which the measurement is taken <br> Optionally the accuracy (if known) <br> Thresholds (i.e. upper/lower levels etc.) |
| local2address (Id) | The logical link entity identifier for the local end | The local identifier can be implicit if the measurement device (MD) is the same as the reporting device. |
| remotel2address (Id) | The logical link entity identifier for the remote end (i.e. the AP) | In the case of multi-RAT deployment the address must be resolvable to a RAT independent level of abstraction |

| 2) VHO Response |
| --- |
| Response := SEQUENCE OF SEQUENCE { <br>     remotel2address Id <br>     channelId ChannelId <br>     rATId RATId <br>     cellLoad CellLoad <br> } |

In the VHO Trigger message the assumption is that the remotel2address is sufficient for uniquely resolving the AP JRRM entity. Therefore, layer 2 methods are employed (i.e. such as Ethernet based with suitable bridging between APs). It is also feasible to use layer 3 methods (i.e. IP address/port) with AP based routers.

The normalised path loss model (NPLM) approach described can be deployed within several scenarios. For instance, for multi-RAT deployments (such as WiFi/femtocell scenarios) the NPLM can be deployed within the JRRM function on the network side (i.e. JRRM-N within an access point). The NPLM prediction only requires the measurements within the AP coverage area, and the general radio parameters concerning the interference prediction (such as RAT and transmit power level) which can be obtained using IEEE 1900.4 context data or similar approaches. The VHO message may be mapped using standard Media Independent Handover (MIH) approaches described in the IEEE 802.21 standard or via a JRRM function that exploits existing technology specific messages. Alternatively, for the use of NPLM within the configuration planning process the NPLM function could be used in a network planning entity such as within Dynamic Self-Organising Network Planning and Management (DSNPM) or the IEEE 1900.4 Network Reconfiguration Manager (NRM) entity on the network side.

While certain embodiments have been described, these embodiments have been presented by way of example only, and are not intended to limit the scope of the inventions. Indeed, the novel methods, systems, devices and networks described herein may be embodied in a variety of other forms; furthermore, various omissions, substitutions and changes may be made without departing from the spirit of the inventions. The accompanying claims and their equivalents are intended to cover such forms or modifications as would fall within the scope and spirit of the inventions.

The invention claimed is:

1. A method in a wireless system, the method comprising:
receiving, at a wireless device of the wireless system, over a first network, from each of a plurality of radios of the first network, a respective reference signal, the respective reference signals forming a first set of reference signals comprising a first reference signal received from a first radio of the first network, and a plurality of further reference signals received from the remaining radios of the plurality of radios of the first network;

receiving, at the wireless device, over a second network, from each of a plurality of radios of the second network, a respective reference signal, the respective reference signals forming a second set of reference signals comprising a first reference signal received from a first radio of the second network, and a plurality of further reference signals received from the remaining radios of the plurality of radios of the second network, wherein the first radio of the first network and the first radio of the second network are located at a common location;

calculating a first set of normalised reference signals from the ratio for each further reference signal of the first set of reference signals with the first reference signal of the first set of reference signals;

calculating a second set of normalised reference signals from the ratio for each further reference signal of the second set of reference signals with the first reference signal of the second set of reference signals;

determining a mean or a largest distance between predictions of signal loss based on the first set of normalised reference signals and predictions of signal loss based on the second set of normalised reference signals to create an estimate of shadow fading or signal reflectors and determining whether a node in the network is a hidden node using the estimate of shadow fading or signal reflectors.

2. A method according to claim 1 wherein the first network has a first communication protocol over a first frequency band and the second network has a second communications protocol over a second frequency band.

3. A method according to claim 2, wherein said determining comprises normalising the predictions of path loss to a reference frequency.

4. A method according to claim 1, further comprising determining from each respective reference signal a transmitted power level for the reference signal and wherein calculating the first and second set of normalised reference signals comprises adjusting the ratio to account for the transmitted power level.

5. A method in a wireless system, the wireless system comprising a first wireless network and a second wireless network, the method comprising:

receiving an indication of signal strengths of a first set of reference signals, the first set of reference signals comprising a first reference signal received by a wireless device from a first node of the first network, and a plurality of further reference signals received by the wireless device from the further nodes of the first network;

receiving an indication of signal strengths of a second set of reference signals, the second set of reference signals comprising a first reference signal received by the wireless device from a first node of the second network, and a plurality of further reference signals received by the wireless device from the further nodes of the second network, wherein the first node of the first network and the first node of the second network are located at a common location;

calculating a first set of normalised reference signals as the ratio for each further reference signal of the first set of reference signals with the first reference signal of the first set of reference signals;

calculating a second set of normalised reference signals as the ratio for each further reference signal of the second set of reference signals with the first reference signal of the second set of reference signals;

determining a mean or a largest distance between predictions of signal loss based on the first set of normalised reference signals and predictions of signal loss based on the second set of normalised reference signals to create an estimate of shadow fading or signal reflectors and determining whether a node in the network is a hidden node using the estimate of shadow fading or signal reflectors.

6. A method according to claim 5 wherein the first network has a first communication protocol over a first frequency band and the second network has a second communications protocol over a second frequency band.

7. A method according to claim 6, wherein said determining comprises normalising the predictions of path loss to a reference frequency.

8. A method according to claim 5, further comprising determining from each respective reference signal a transmitted power level for the reference signal and wherein calculating the first and second set of normalised reference signals comprises adjusting the ratio to account for the transmitted power level.

9. A method according to claim 5, wherein each of the reference signals is transmitted at the same power level.

10. A non-transitory computer program carrier medium carrying computer executable instructions which when executed on a processor cause the processor to execute a method according to claim 1.

11. A non-transitory computer program carrier medium carrying computer executable instructions which when executed on a processor cause the processor to execute a method according to claim 5.

12. A network management module for a wireless network system, the network management module comprising:
an interface operable to
receive an indication of signal strengths of a first set of reference signals, the first set of reference signals comprising a first reference signal received by a wireless device from a first node of a first network, and a plurality of further reference signals received by the wireless device from the further nodes of the first network; and receive an indication of signal strengths of a second set of reference signals, the second set of reference signals comprising a first reference signal received by the wireless device from a first node of a second network, and a plurality of further reference signals received by the wireless device from the further nodes of the second network, wherein the first node of the first network and the first node of the second network are located at a common location; and a processor operable to:

calculate a first set of normalised reference signals as the ratio for each further reference signal of the first set of reference signals with the first reference signal of the first set of reference signals;

calculate a second set of normalised reference signals as the ratio for each further reference signal of the second set of reference signals with the first reference signal of the second set of reference signals;

determine a mean or a largest distance between predictions of signal loss based on the first set of normalised reference signals and predictions of signal loss based on the second set of normalised reference signals to create an estimate of shadow fading or signal reflectors; and determining whether a node in the network is a hidden node using the estimate of shadow fading or signal reflectors.

13. A network management module according to claim 12, wherein the first network has a first communication protocol over a first frequency band and the second network has a second communications protocol over a second frequency band.

14. A network management module according to claim 13, wherein the processor is operable to normalise the predictions of path loss to a reference frequency.

15. A measurement device for a wireless network, the measurement device comprising:
a measurement processor and a memory coupled to the measurement processor, the memory storing instructions which, when executed by the measurement processor cause the measurement processor to:
receive, over a first network, from each of a plurality of radios of the first network, a respective reference signal, the respective reference signals forming a first set of reference signals comprising a first reference signal received from a first radio of the first network, and a plurality of further reference signals received from the remaining radios of the plurality of radios of the first network;

receive, over a second network, from each of a plurality of radios of the second network, a respective reference signal, the respective reference signals forming a second set of reference signals comprising a first reference signal received from a first radio of the second network, and a plurality of further reference signals received from the remaining radios of the plurality of radios of the second network, wherein the first radio of the first network and the first radio of the second network are located at a common location; and a processor and a memory coupled to the processor, the memory storing instructions which, when executed by the processor cause the processor to:

calculate a first set of normalised reference signals from the ratio for each further reference signal of the first set of reference signals with the first reference signal of the first set of reference signals;

calculate a second set of normalised reference signals from the ratio for each further reference signal of the second set of reference signals with the first reference signal of the second set of reference signals;

determine a mean or a largest distance between predictions of signal loss based on the first set of normalised reference signals and predictions of signal loss based on the second set of normalised reference signals to create an estimate of shadow fading or signal reflectors; and determining whether a node in the network is a hidden node using the estimate of shadow fading or signal reflectors.

16. A measurement device according to claim 15, wherein the first network has a first communication protocol over a first frequency band and the second network has a second communications protocol over a second frequency band.

17. A measurement device according to claim 16, wherein the instructions, when executed by the processor, cause the processor to normalise the predictions of path loss to a reference frequency when determining the estimate of shadow fading or signal reflectors.

* * * * *